(12) United States Patent
Holman et al.

(10) Patent No.: US 10,990,986 B2
(45) Date of Patent: Apr. 27, 2021

(54) SYSTEM AND METHOD FOR OPTIMIZING AN OBSERVATION CAMPAIGN IN RESPONSE TO OBSERVED REAL-WORLD DATA

(71) Applicant: Observa, Inc., Seattle, WA (US)

(72) Inventors: Hugh Howard Holman, Seattle, WA (US); Erik Eugene Chelstad, Seattle, WA (US)

(73) Assignee: Observa, Inc., Seattle, WA (US)

( * ) Notice: Subject to any disclaimer, the term of this patent is extended or adjusted under 35 U.S.C. 154(b) by 158 days.

(21) Appl. No.: 15/239,607

(22) Filed: Aug. 17, 2016

(65) Prior Publication Data

US 2018/0053196 A1 Feb. 22, 2018

(51) Int. Cl.
*G06Q 30/02* (2012.01)
*G06F 16/28* (2019.01)

(52) U.S. Cl.
CPC ....... *G06Q 30/0201* (2013.01); *G06F 16/285* (2019.01)

(58) Field of Classification Search
CPC .......................... G06Q 30/0201; G06F 16/285
See application file for complete search history.

(56) References Cited

U.S. PATENT DOCUMENTS

| | | | | |
|---|---|---|---|---|
| 6,026,387 A * | 2/2000 | Kesel | ..................... | G06Q 30/02 706/45 |
| 6,633,851 B1 * | 10/2003 | Engler | ................... | G06Q 10/10 705/21 |
| 8,064,896 B2 | 11/2011 | Bell et al. | | |
| 9,361,353 B1 | 6/2016 | Aristides | | |
| 9,508,082 B1 * | 11/2016 | Mannix | .............. | G06Q 30/0201 |
| 2003/0009373 A1 * | 1/2003 | Ensing | ............... | G06Q 10/0637 705/7.33 |
| 2004/0034684 A1 * | 2/2004 | Payne | ................... | G06Q 10/10 709/201 |
| 2005/0149382 A1 * | 7/2005 | Fenner | ................... | G06Q 30/02 705/7.32 |
| 2006/0167971 A1 | 7/2006 | Breiner | | |

(Continued)

OTHER PUBLICATIONS

The reliability and validity of objective measures of customer service: mystery shopping J Dawes, B Sharp—Australian Journal of Market Research, 2000—researchgate.net (Year: 2000).*

(Continued)

*Primary Examiner* — Jonathan G Sterrett
(74) *Attorney, Agent, or Firm* — FisherBroyles LLP; Kevin D. Jablonski (57) ABSTRACT

Systems, apparatuses, and methods for improving an observation campaign in response analytical data collected form observations. An observation campaign may be a set of campaign parameters designed to incentivize observers of real-world data to collect and send electronic communication of the collected real-world data to the observation platform. By analyzing the collected real-world data against one or more defined metrics, one or more parameters of the observation campaign may be changed in an effort to improve the collection of the real-world data. Further, the improved set of observation campaign parameters may be used to establish or improve observation campaign templates as well as improving similar bit unrelated observation campaign.

20 Claims, 6 Drawing Sheets

(56) References Cited

U.S. PATENT DOCUMENTS

| | | | |
|---|---|---|---|
| 2008/0183552 A1* | 7/2008 | O'Hagan | G06Q 10/06375 705/7.31 |
| 2009/0063306 A1 | 3/2009 | Fano et al. | |
| 2009/0204471 A1 | 8/2009 | Elenbaas et al. | |
| 2009/0240516 A1 | 9/2009 | Palestrant | |
| 2010/0171826 A1 | 7/2010 | Hamilton et al. | |
| 2011/0212717 A1* | 9/2011 | Rhoads | G06F 16/58 455/420 |
| 2012/0029978 A1* | 2/2012 | Olding | G06Q 10/06 705/7.42 |
| 2012/0047008 A1 | 2/2012 | Alhadeff et al. | |
| 2012/0265574 A1* | 10/2012 | Olding | G06Q 10/06 705/7.14 |
| 2013/0018957 A1* | 1/2013 | Parnaby | G06Q 50/01 709/204 |
| 2013/0079128 A1 | 3/2013 | Thomas et al. | |
| 2013/0132170 A1 | 5/2013 | Yelisetti et al. | |
| 2013/0132987 A1* | 5/2013 | Narasimhan | H04N 21/25866 725/14 |
| 2013/0204652 A1 | 8/2013 | Marins et al. | |
| 2013/0282446 A1 | 10/2013 | Dobell | |
| 2014/0180772 A1 | 6/2014 | Tutupata et al. | |
| 2014/0249889 A1 | 9/2014 | Park et al. | |
| 2014/0278850 A1* | 9/2014 | Boccuzzi, Jr. | G06Q 30/0208 705/14.11 |
| 2014/0324555 A1 | 10/2014 | Wu et al. | |
| 2014/0343984 A1* | 11/2014 | Shahabi | G06Q 10/06311 705/7.13 |
| 2014/0379399 A1 | 12/2014 | Brydon et al. | |
| 2015/0032533 A1 | 1/2015 | Raab et al. | |
| 2015/0178742 A1* | 6/2015 | Smith | H04L 67/36 705/7.29 |
| 2015/0213315 A1* | 7/2015 | Gross | G06F 16/5838 382/159 |
| 2015/0254593 A1 | 9/2015 | Rinze et al. | |
| 2015/0347520 A1* | 12/2015 | King | G06F 16/9535 707/741 |
| 2015/0356489 A1 | 12/2015 | Kazai et al. | |
| 2016/0027051 A1* | 1/2016 | Gross | G06Q 50/16 705/14.54 |
| 2016/0078499 A1 | 3/2016 | Brown et al. | |
| 2016/0180365 A1 | 6/2016 | Shi et al. | |
| 2016/0253710 A1 | 9/2016 | Publicover et al. | |
| 2016/0350697 A1* | 12/2016 | Gruen | G06Q 10/06395 |
| 2017/0053330 A1 | 2/2017 | Smith et al. | |
| 2017/0098197 A1 | 4/2017 | Yu et al. | |
| 2017/0221156 A1* | 8/2017 | Mingarelli | G06Q 50/01 |
| 2017/0249574 A1 | 8/2017 | Knijnik et al. | |
| 2017/0331877 A1* | 11/2017 | Balasubramanian | H04L 67/06 |
| 2018/0293616 A1 | 10/2018 | Greenhood | |

OTHER PUBLICATIONS

The future of hotel rating W Hensens—Journal of Tourism Futures, 2015—emeraldinsight.com (Year: 2015).*

Transferring Knowledge from a Crowd to a Retail Company—A case study of Roamler Sweden S Gisterå, M Carlander—2015—diva-portal.org (Year: 2015).*

A conceptual model for mystery shopping motivations P Allison, D Severt, D Dickson—Journal of hospitality marketing & . . . , 2010—Taylor & Francis (Year: 2010).*

Exploring the Consequences of Shopper-Facing Technologies: Their Effect on Shopper Experiences and Shopping Outcomes BI Spaid—2014—trace.tennessee.edu (Year: 2014).*

"MINSIZE2: A computer program for determining effect size and minimum sample size for statistical significance for univariate, multivariate, and nonparametric tests", DT Morse—Educational and Psychological Measurement, 1999—journals.sagepub.com (Year: 1999).* http://web.archive.org/web/20150226150240/http://www.gigwalk.com/crowdsourcing (Year: 2015).* http://web.archive.org/web/20150223140532/http://www.gigwalk.com/case-study/Gigwalk_mobileretail_whitesheet.html (Year: 2015).*

Position validation in crowdsourced accessibility mapping RM Rice, AO Aburizaiza, MT Rice . . . - . . . : The International Journal . . . , 2016—utpjournals.press (Year: 2016).*

The motivations and experiences of the on-demand mobile workforce R Teodoro, P Ozturk, M Naaman, W Mason . . . —Proceedings of the 17th . . . , 2014—dl.acm.org (Year: 2014).*

ISR/WO dated Jan. 30, 2018 for PCT/US17/062829; filed Nov. 21, 2017.

Grocery & Retail News. "Get Paid for Snooping on Your Supermarket," <URL: http://couponsinthenews.com/2016/05/16/get-paid-for-snooping-on-your-supermarket/>.

ISR/WO dated Mar. 8, 2018; for PCT/US17/062816, filed Nov. 21, 2017.

Applying the service profit chain in a retail environment: Challenging the "Satisfaction mirror", R. Silvestro, S. Cross—International Jounral of Service Industry . . . , 2000—emeraldinsignt.com (Year: 2000).

"Applying the service profit chain to analyse retail performance: the case of the managerial strait jacket?" M. Pritchard, R. Silvestro—International Journal of Service . . . , 2005—emeraldinsight.com (Year: 2015).

"Crowdforge: Crowdsourcing complex work", A.Kittur, B. Smus, S. Khamkar, RE Kraut—Proceedings of the 24th annuity . . . , 2011—dl.acm.org (Year: 2011).

"Quality control in crowdsourcing systems: Issues and directions" M. Allahbakhsh, B. Benatallah, A. Ignjatovic . . . —IEEE Internet . . . , 2013—ieeexplore.ieee.org (Year: 2013).

* cited by examiner

| CAMPAIGN 300 | Total Cost Outlay 310 |
| --- | --- |
| | Cost per Observation 311 |
| | Total Number of Observations 312 |
| | Time Frame 313 |
| | Geographic Limitations 314 |
| | Diminishing Cost per Observation 315 |
| | Observer Reputation Limitations 316 |
| | Variable Cost Per Transaction 317 |
| | Failure Parameters 318 |
| | Image Quality Parameters 319 |
| | Opportunity/Acceptance Lockout 320 |
| | Observation Success Termination 321 |

SYSTEM AND METHOD FOR OPTIMIZING AN OBSERVATION CAMPAIGN IN RESPONSE TO OBSERVED REAL-WORLD DATA

BACKGROUND

Individuals and businesses often desire to collect data about various situations that exist in the real-world. For example, a manufacturer of a product may wish to collect data about how the product is being displayed at a retail location. However, individuals and enterprises, and government and non-governmental agencies, often do not have the time and/or resources available to travel to myriad locations or employ agents to do so. This challenge becomes amplified as the time window for the information collection becomes more specific and/or the physical locations from which the information is to be collected grow in number or distance. For example, merchants in the delivery chain of products for retail sale, whether manufacturers, wholesalers, brokers, or the like, may need to determine if, when, how much, in what way or condition, or at what price their goods are being put in front of consumers. Another example might be a property or business owner that contracts for a periodic service about which they would like to validate the quality and completeness of service delivery. In short, the condition of physical locations or some physically observable condition at the locations is desirable data to observe, obtain, and document.

Sometimes these needs for data occur in a predictable recurring pattern. The data may also be best obtained within a narrow time window. For example, a restaurant owner checking on bathroom cleanliness may only desire to obtain the information for the first hour in which a restaurant is open, as after that, customers may have used the bathrooms extensively. In another example, merchants who sell goods and products through retailers often have guidelines, rules, and restrictions for how various retailers are to present and price the goods and products at the purchase location. For example, merchants may wish to negotiate with retailers for specific shelf space for the merchant's goods and products or the merchant may wish to disallow lowering of the retail price for the merchant's goods and products.

Individuals and business wishing to obtain observable real-world data may hire staff to ensure that the various standards, conditions, guidelines, rules, and/or restrictions are met. That is, employees or agents may travel to various locations at various times to observe and collect the real-world data with regard to various conditions, guidelines, rules, and/or restrictions in order to ensure satisfaction and compliance. Of course, such employees and agents can be expensive in terms of payroll and travel expenses. Therefore, organizations often must rely on others to follow the negotiated conditions, guidelines, rules, and restrictions. However, at times, those other actors often have little incentive to go to any great length to ensure that standards or conditions are met or to ensure compliance with applicable guidelines, rules, and/or restrictions. As a result, many businesses are unable to ensure that their standards, conditions, guidelines, rules, and/or restrictions are followed with regularity.

BRIEF DESCRIPTION OF THE DRAWINGS

Embodiments of the subject matter disclosed herein in accordance with the present disclosure will be described with reference to the drawings, in which.

Note that the same numbers are used throughout the disclosure and figures to reference like components and features.

DETAILED DESCRIPTION

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments by which the systems and methods described herein may be practiced. These systems and methods may, however, be embodied in many different forms and should not be construed as limited to the embodiments set forth herein; rather, these embodiments are provided so that this disclosure will satisfy the statutory requirements and convey the scope of the subject matter to those skilled in the art.

By way of overview, the systems and methods discussed herein may be directed to an observation platform for coordinators, merchants, retailers, and users to establish, utilize and fulfill an observation campaign suited to verify real-world implementations surrounding observable, standards, conditions, rules, guidelines, and/or restrictions. The observable data points may be part of an overall strategy in an observation campaign established by an observation campaign coordinator. Such a strategy may often involve determining data points like specific product placement, product pricing, and product incentives at the retail location. A user of this platform, called an observer hereinafter, may use an application downloaded to and executing on a computing device, to identify specific observation campaign opportunities. An observation campaign may be a set of verifiable parameters that define specifics about an observation campaign strategy. These verifiable parameters may include specific observable and verifiable real-world data such as where a product is placed on a retail shelf, whether promotional materials are displayed with the product, inventory count, and product pricing.

Once an opportunity is identified and accepted, the user may collect the real-world data through various methods including, key entry, temperature observance, sound recording, video recording, barometric pressure observance, sound-pressure level observance and image capture (using one or more applications executing on a computing device, such as a mobile phone). The captured real-world data may then be uploaded to the observation platform in order to determine if the parameters of the observation campaign have been met (e.g., correct data, clear image, timely collection, and the like). If the collected and now uploaded real-world data is verified, then the collected real-world may be further analyzed against various data metrics (e.g., success rate of observations, failure rate of observations, geographic data analysis, overall observation rate) in order to determine if any parameters of an observation campaign should be changed to address a data metrics issue (e.g., observation are not timely enough, observations are lacking in a specific geographic region). Such analytical data may be used to improve parameters of an observation campaign to better achieve the observation goals. These and other aspects are described in greater detail below with respect to FIGS. 1-6.

Figure 1:
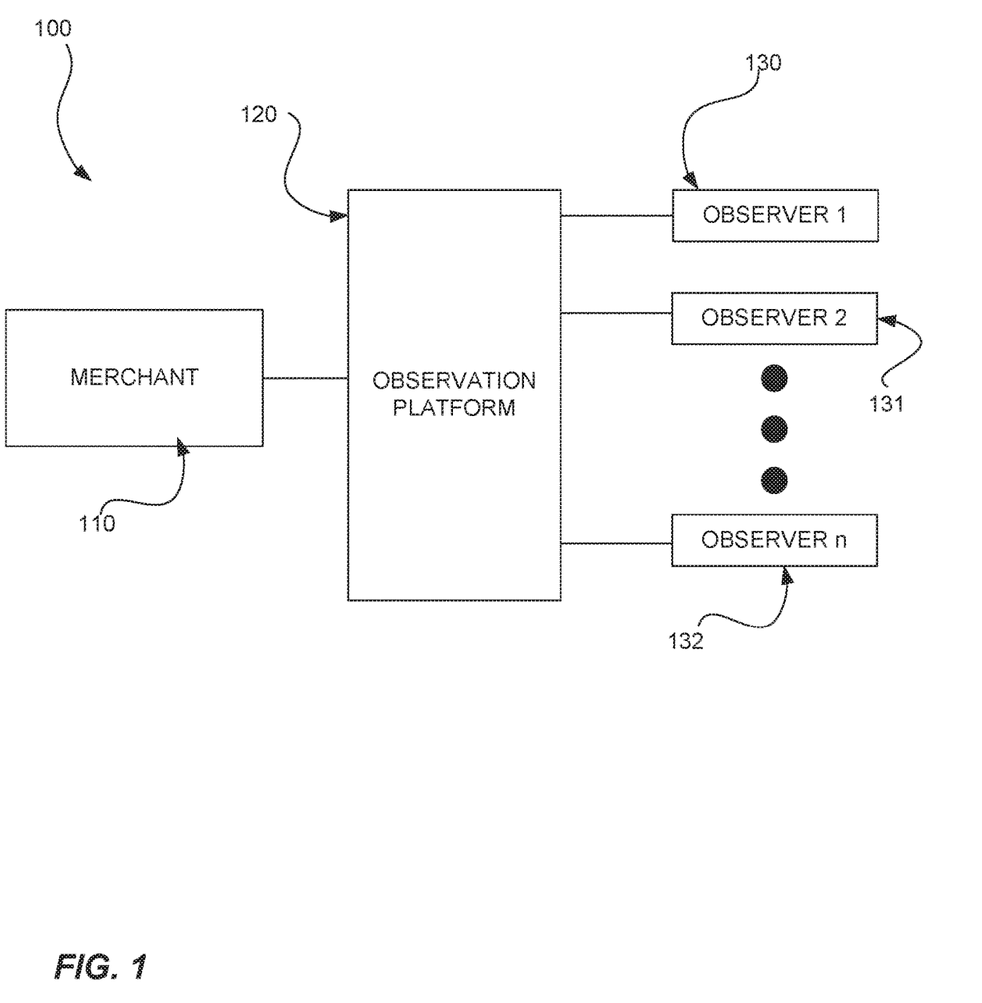
FIG. 1 is a basic block diagram illustrating elements or components of an example system in which an embodiment of the subject matter disclosed herein may be implemented.

FIG. 1 is a basic block diagram illustrating elements or components of an example system 100 in which an embodiment of the subject matter disclosed herein may be implemented. In the context of FIG. 1 and other figures, a continuing example of a merchant-based observation campaign will be used. Thus, various real-world data points specific to a merchant that sells goods at retail locations will also be used in context. A skilled artisan understands that the coordinator of an observation campaign need not be a merchant with merchant-specific data points. For example, a coordinator of an observation campaign may be a quality-assurance coordinator seeking to collect data about installations of observable projects, e.g., power transmission pole installations, bathroom conditions in public transit, traffic conditions, and the like. In short, a coordinator of an observation campaign may be any individual, business, government agency, or entity that wishes to incentivize observers to collect real-world data from myriad locations. However, for ease of illustration and for consistent examples, the remaining disclosure will use the merchant product and retail location example without limiting the interpretation or scope of the claims or specification.

As discussed briefly above in an overview, an observation platform 120 provides systems and methods for a merchant 110 to establish and implement an observation campaign for various observers 130, 131, and 132 to collect real world data about the observation campaign established by the merchant 110. In this system 100, the merchant block 110, the observation platform block 120 and each observer block 130, 131, and 132 may represent a separate computing device or group of computing devices. Further, the connections between these computing devices may be any communication link, such as the Internet, BlueTooth™ wireless, direct serial link, and the like. The various computing device implementations and embodiments are discussed below.

The observation platform 120 may be embodied in whole or in part as a computing system that includes one or more server computers configured in a cloud-based computing environment. Embodiments may take the form of a hardware implemented embodiment, a software implemented embodiment, or an embodiment combining software and hardware aspects. Further, various computing aspects of the underlying systems and methods may transcend any specific computing entity and the "block" diagram nature of FIG. 1 is intended to illustrate one embodiment. For example, in some embodiments, one or more of the operations, functions, processes, or methods described herein may be implemented by one or more suitable processing elements (such as a processor, microprocessor, CPU, controller, etc.) that are part of a client device, server, network element, or other form of computing or data processing device/platform and that is programmed with a set of executable instructions (e.g., software instructions), where the instructions may be stored in a suitable non-transitory data storage element. In some embodiments, one or more of the operations, functions, processes, or methods described herein may be implemented by a specialized form of hardware, such as a programmable gate array, application specific integrated circuit (ASIC), or the like. This detailed description is, therefore, not to be taken in a limiting sense.

As alluded to, in some embodiments, the subject matter may be implemented in the context of a "cloud" based computing environment typically used to develop and provide web services and business applications for end users. Further aspects of an exemplary implementation environment will be described with reference to FIGS. 2-5 below. Note that embodiments may also be implemented in the context of other computing or operational environments or systems, such as for an individual business data processing system, a private network used with a plurality of client terminals, a remote or on-site data processing system, another form of client-server architecture, and the like.

The merchant computing device 110 may also be one or more of any number of computing device implementations. In one embodiment, the merchant computing device 110 may be a personal computer or mobile computing device. The merchant computing device 110 may be communicatively coupled to the observation platform 120 through an Internet connection or other communication network. Further, the merchant computing device 110 may be configured to execute a merchant observation application (not shown) that may provide various graphical user interfaces (GUIs) for a merchant to navigate and utilize the observation platform 120, such as, for example, establishing an observation campaign. Various operations and parameters of the merchant computing device 110 are described further below with respect to FIG. 2.

Each observer computing device 130, 131, and 132 may also be one or more of any number of computing device implementations. In one embodiment, each observer computing device 130, 131, and 132 may be a mobile computing device. Each observer computing device 130, 131, and 132 may be communicatively coupled to the observation platform 120 through an Internet connection or other communication network. Further, each observer computing device 130, 131, and 132 may be configured to execute an observer application (not shown) that may provide various GUIs for an observer to navigate and utilize the observation platform 120, such as, for example, fulfilling an opportunity in an observation campaign. Various operations and parameters of the observer computing devices 130, 131, and 132 are also described further below with respect to FIG. 2.

Figure 2:
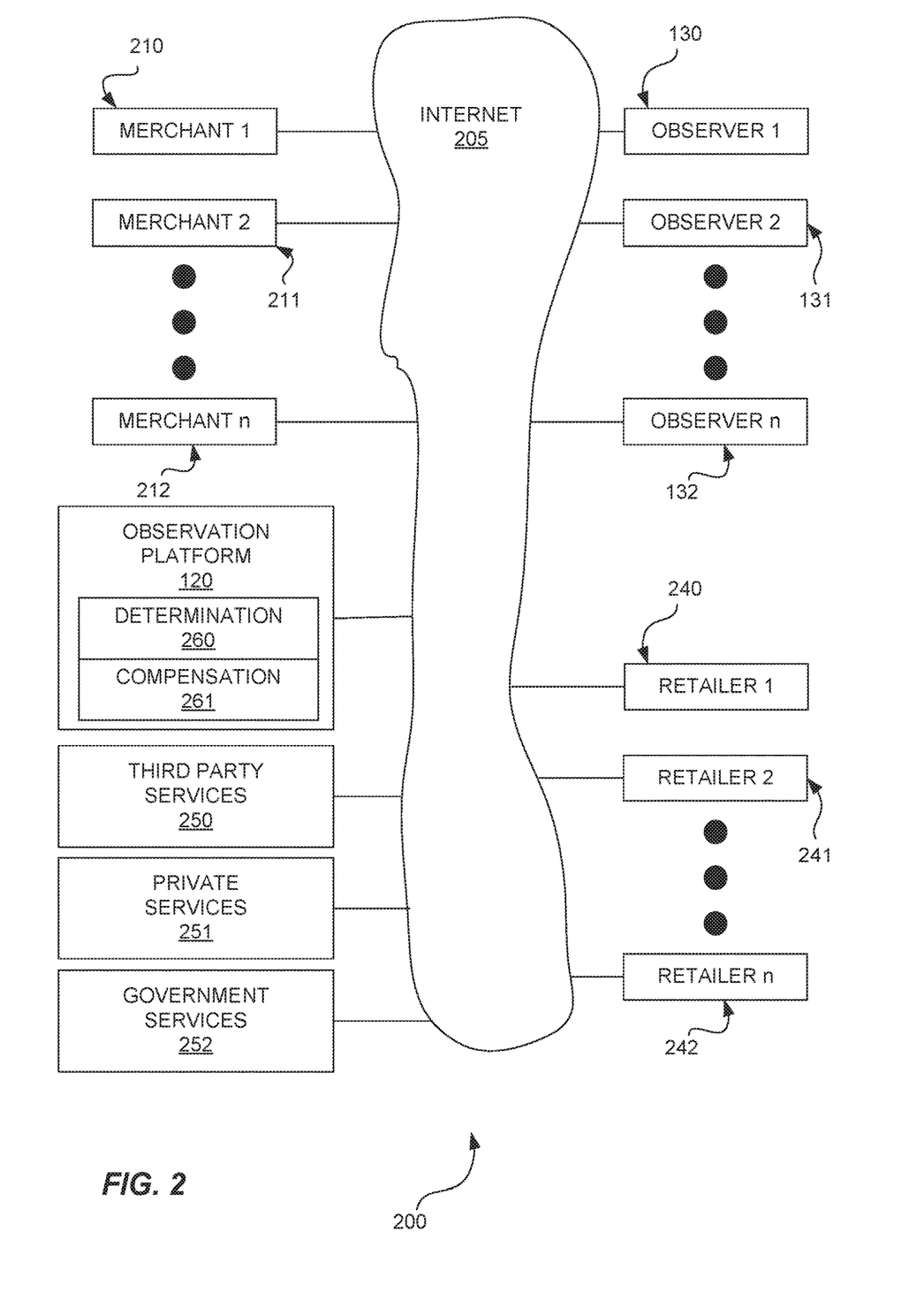
FIG. 2 is a more detailed block diagram of the basic system of FIG. 1 illustrating elements or components of an example system in which an embodiment of the subject matter disclosed herein may be implemented.

FIG. 2 is a more detailed block diagram of the basic system of FIG. 1 illustrating elements or components of an example system 200 in which an embodiment of the subject matter disclosed herein may be implemented. Some elements of FIG. 1 are also shown in FIG. 2 and bear the same reference numerals. In particular, the observation platform 120 may be coupled to computer network 205 such as the Internet, just as observer computing device 130, 132, and 132 are also connected via the network 205. A skilled artisan understands that the designation of observer 1 130 through observer n 132 indicates that any number of merchants may be shown as interfacing with the system 200 (whether such interfacing is discrete or collaborative). In this system 200 embodiment, more than one merchant computing device is shown. Thus, merchant computing devices 210, 211, and 212 may represent different merchants who may individually and independently craft observation campaigns on the observation platform 120 via the network 205. A skilled artisan understands that the designation of merchant 1 210 through merchant n 212 indicates that any number of merchants may be shown as interfacing with the system 200.

Additional computing devices may also be communicatively coupled to the observation platform 120 via the computer network 205. As will be discussed further below, the system 200 may include a number of retailer computing devices 240, 241, and 242. A skilled artisan understands that the designation of retailer 1 240 through retailer n 242 indicates that any number of merchants may be shown as interfacing with the system 200. Further, the system 200 may include computing devices associated with third party services 250, private services 251, and government services 252. Prior to discussing the additional roles for these additional computing devices, the observation platform 120 as well as the observers' and merchants' roles are discussed next.

By way of general overview of the system in FIG. 2, one embodiment may include a user-based mobile computing device 130 (e.g., a mobile phone, a smart phone, a laptop computer, and handheld computer, a wearable computing device, an augmented reality device, and the like) configured to execute an observation application to coordinate observing and collecting of real-world data. Further, the system may include an observation server computer 120 configured to send notifications that include one or more opportunities for observations of real-word data to the user-based mobile computing device 130 and configured to receive real world data observed and collected by the user-based mobile computing device 130. Further yet, the system may include a merchant-based computing device 210 communicatively coupled to the observation server computer 120 and configured to generate and control a campaign of opportunities sent by the observation server computer 120.

As briefly discussed above, the observation platform 120 may be one or more computing devices configured to work as a server computing entity in a cloud-based computing environment to establish and facilitate observation campaigns for one or merchants. As used throughout this disclosure, an observation campaign is a set of parameters established by a merchant using one or more inter-related applications operating in the system 200 and coordinated from the observation platform 120. The observation campaign may include a number of parameters designed to encourage various remote users of an observation application (e.g., observers) to collect real-world data about products and goods for sale at various retail locations.

A merchant that establishes an observation campaign using the observation platform 120 desires to know more about the retail locations and point of sale for goods and products in the marketplace. For example, a merchant may negotiate a deal to have products placed in specific eye-level locations on shelves at retail locations and may wish to verify that the products are, in fact, placed on eye-level shelves at the various retail locations. By establishing an observation campaign eliciting this kind of real-world data (e.g., digital images of the product for sale on eye-level shelves at a particular retail location), the merchant can incentivize observers (through compensation offered by the observation platform) to fulfill the requirements of the specific real-world data collection. That is, the merchant may enable an observation campaign through a contract with a proprietor of the observation platform such that the observation platform then offers monetary compensation to one or more observers in exchange for a timely and meaningful collection of real-world data (e.g., a picture) of the merchant's product for sale at a specific retail location. This eliminates the need for the merchant to employ one or more individuals to travel to the retail location to verify such real-world data.

As used herein, the term real-world data may refer to specific observable facts about anything of interest to the coordinator of the campaign. Real-world data may be data that can be collected in the real world (as opposed to data that may reside on a retailer's computer). In one example, real-world data may be a digital image of a product for sale at a retail location such that data may be gleaned from the image, such as product location on a shelf, product location in proximity to other products, product label facing outwards, product price can be seen, product price is correct, additional promotional material is proximate, and the like. Real-world data includes any observable verifiable data point collectable through any manner of sensing, recording, or observing.

In this manner, any merchant can use the observation platform to design an observation campaign to incentivize observers to collect very specific kinds of real-world data at very specific locations over very specific time frames. When designing an observation campaign, the merchant may establish observation opportunities based on a desired time frame; for example, a campaign may only have opportunities offered for a one-week time frame or just a few hours in any given day. Further, the merchant may establish observation opportunities based on a desired location such as retail locations in a specific city or within 100 miles of a particular location. Further yet, the merchant may establish observation opportunities based on a desired total number of observations—e.g., a cap of 10 different successful observations. Other campaign parameters are possible and discussed further below with respect to FIG. 3.

As opportunities for observation become active (that is, users of the observer application may be offered opportunities via the application) various observers may engage in the various opportunities. Opportunities may be sent as notifications to observers (via a smart phone application and the like). Such notifications may be influenced by geographic location of various observers (e.g., notifications are only sent to observers proximate to a desired observation retail location). Further, such notification may be influenced by a relative reputation of an observer (e.g., only the "best" observers receive certain opportunities).

Once an opportunity is received, the observer may accept the opportunity and begin an observation. Some opportunities may have time limits for acceptance of the opportunity and/or time limits for fulfillment of an accepted opportunity. The observation may be simply sending the requested real-world data to the observation platform 120 for evaluation. The observation platform may include a module for determining 260 whether the received real-world data from any observer meets the requirements and parameters of an opportunity in an active observation campaign. The determination module 260 may be configured to determine if the received real-world data from the observer (e.g., sent from user-based mobile computing device) fulfills one or more criteria for data collection in the observation campaign opportunity. Such criteria may include timeliness, image quality, data applicability, data completeness and the like.

If the determination module 260 determines that the received real-world data from an observer meets the requirements of an observation opportunity, (e.g., the opportunity has been fulfilled), then a compensation module 261 may initiate compensation to the observer for successfully fulfilling an observation campaign opportunity. Such compensation may be financial or non-financial. In one embodiment, the compensation module 261 may communicate with one or more third-party services to credit a bank account associated with the observers that fulfilled the opportunity. Further, the compensation module may also track total financial compensation to specific observers and communication said total to government services 252 on an annual or other periodic basis. In other embodiments, the compensation module 261 may communicate with other private services 251, such as social media or online retail, to provide non-financial remuneration to the observer. For example, the observer may qualify for discounts or privileges at third party locations (e.g., food coupons, gift cards, free entry into a sporting event, and the like).

Figure 3:
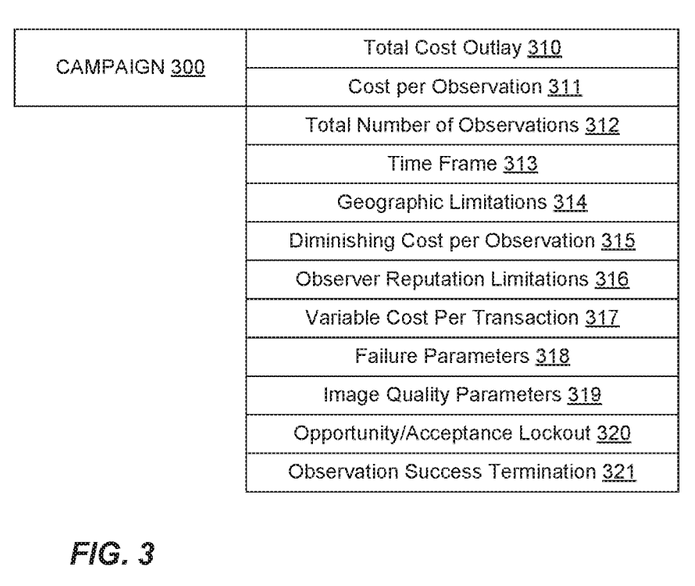
FIG. 3 is a data structure diagram illustrating parameters of an example observation campaign used in conjunction with the system of FIG. 2 according to an embodiment of the subject matter disclosed herein.

FIG. 3 is a data structure diagram illustrating parameters of an example observation campaign 300 used in conjunction with the system of FIG. 2 according to an embodiment of the subject matter disclosed herein. As discussed above, one or more merchants (210-212 of FIG. 2) may establish and coordinate an observation campaign with several different configurable parameters. FIG. 3 is an illustration of a data structure of one embodiment of an observation campaign 300. It is understood that the parameters shown in FIG. 3 are illustrative and any number of parameters (either greater of fewer than shown in FIG. 3) may be present. These parameters assist in shaping how observers will be incentivized to collect real world data in response to opportunities presented in the campaign 300. It is also understood that certain identification and demographic parameters (such as merchant name, merchant product, bank data, and the like) may also be established with respect to the merchant. These are not discussed here as the focus of FIG. 3 is on the customizable parameters of an observation campaign 300.

A first parameter in which a merchant may customize an observation campaign 300 is a total cost outlay 310. In this respect, the merchant and the proprietor of the observation platform reach an agreement about the total cost of the observation campaign. The observation platform may then set specific compensation rates for successful observation in order to meet the needs of the established observation campaign. Further, the merchant or the observation platform may choose to designate a maximum (or minimum) amount of financial compensation to be awarded to observers for successfully retrieving real-world data in fulfillment of an observation opportunity. This may be an aggregated amount on a per campaign basis. For example, a merchant may wish to collect data about as many product placements as possible until a threshold amount of money has been reached (in terms of financial compensation to all observers in an aggregate manner). This total may also be an aggregate cost outlay for non-financial outlay (e.g., a limit of 10 discount coupons awarded).

In addition to the total cost outlay, the merchant may also configure a parameter associated with a total cost per observation 311. In this manner, the individual observation may be capped at a maximum amount of financial or non-financial compensation. The merchant may also define a minimum cost per observation and can establish a sliding scale for cost per observation according to a number of different variables. For example, the merchant may choose to pay more per observation for the first 10 observations and then drop the cost per observation. As another example, the cost per observation may be more during a particular time period, such as late night and then less during a different time period, such as morning. Thus, additional parameters regarding variable cost per transaction 317 may be configured.

The merchant may configure a parameter associated with a total number of observations 312. In this manner, each observation may be counted and once a limit has been reached, the campaign is suspended. The merchant may also define a minimum number of observations needed in order for a campaign to end at a time limit or within a time frame 313. Still further, the merchant may establish a fixed time frame 313 in which the campaign must begin and end. For example, the merchant may choose to establish a time frame of June $1^{st}$ to June $30^{th}$ for which a total number of observations in limited to 1000. Once 1000 observations are reached, the campaign may end. Also, the merchant may establish 100 observations as a minimum threshold in which case, the campaign can only end on June $30^{th}$ if 100 observations are entered.

The merchant may configure a parameter associated with a geographic limitation 314 of the campaign. Several geographic parameters may be established, such as a relative geographic limit of a state, city of country or an absolute geographic limit of within 500 miles of a specific location (company headquarters, for example). There may be additional parameters about limiting the number of observation within geographic regions or limiting the total cost outlay according to geographic region. Further yet, cost per observation may be configured on a per region basis (e.g., paying more for region 1 than region 2).

The merchant may configure a parameter associated with a diminishing cost per observation 315, choosing to pay more for initial observations when compared to later observations. The parameters may be reversed to pay more for each additional observation after a certain threshold has been reached. Further, the merchant may limit observers who can participate in a campaign to only observers who have reached a specific observer reputation score or ranking 316.

Additional parameters in a campaign may include failure parameters 318 that may suspend a campaign if a threshold of failed observations is entered or the real-world data collected in initial observations indicates that additional failures will be imminent or predictable. There may be restrictions on the type and quality of images received from observers based on image quality parameters 319. The merchant may establish opportunity lockout parameters 320 for observers who accept an opportunity and then are given two hours of exclusivity to the opportunity to fulfill it. Lastly, in this embodiment, a merchant may define a successful campaign termination parameter 321 so that a campaign may end when a threshold number of successful observations has been reached or a statistically valid number of successful observations is reached. There are additional parameters that may be configured in an observation campaign 300, but are not discussed herein for brevity.

Figure 4:
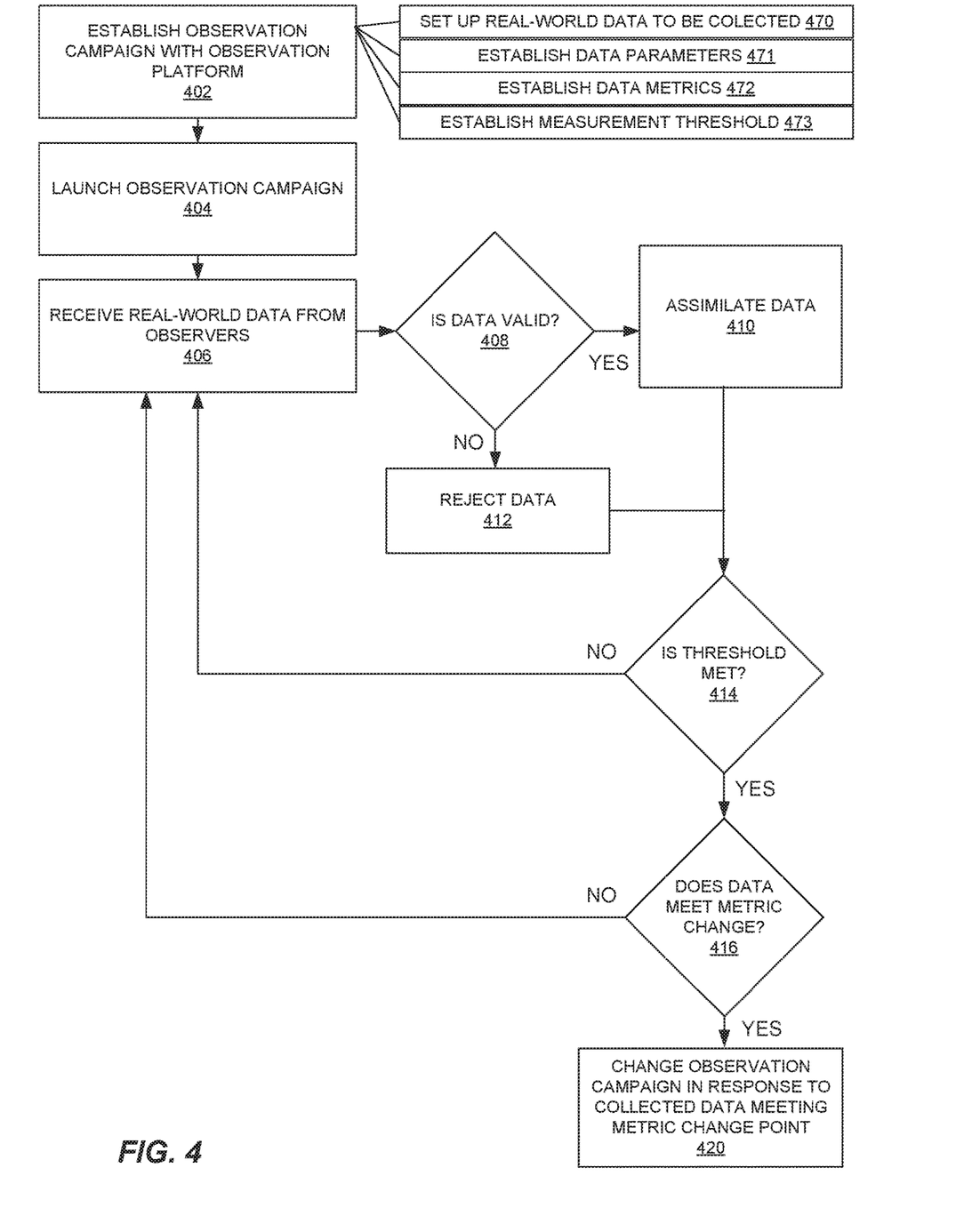
FIG. 4 is a method flow diagram illustrating a method for optimizing an observation campaign through analysis of collected data using the example system of FIG. 2 according to an embodiment of the subject matter disclosed herein.

FIG. 4 is a method flow diagram illustrating a method for optimizing an observation campaign through analysis of collected data using the example system of FIG. 2 according to an embodiment of the subject matter disclosed herein. An observation campaign may be established with a number of parameters chosen by the campaign coordinator to incentivize collection of real-world data that suits the needs of the campaign coordinator. However, in a complex incentive environment across a cloud platform involving many unrelated individuals, a great amount of guess work may be involved in initially establishing the parameters of the observation campaign. Thus, the campaign coordinator may also establish specific metrics with specific parameters in an effort to automatically modify the observation campaign in response to real-world data being collected and analyzed against one or more metrics.

As but one example, the observation campaign may establish a specific geographic location having a perimeter surrounding the map point (e.g., a radius of one mile surrounding a location. In an embodiment, any observer that travels into the one mile radius region may then receive an alert via an observation application executing on the observer's smart phone indicating that the observation opportunity is available. However, a metric may be established that tracks the number of observations over a set time period. Thus, if 24 hours pass without a single observation, this metric may be used to then change the one mile radius parameter by which observers are notified. For example, the radius may be increased to two miles or three miles.

As another example, an observation campaign may be established providing opportunities to observers that offer a $5.00 payment in return for a valid observation. After a set period of time or after a set number of observations, the rate of successful observation over the time period may be analyzed against a metric. In an embodiment, the analysis may result in determining that the observation campaign is returning more observations that what is required for meaningful, statistical conclusions about the real-world data. As a result, the observation campaign parameter regarding payment offered per observation may be reduced from $5.00 to $3.00.

Thus, the system and method may be established for the observation campaign platform to receive electronic communications from one or more remote computing devices (observer's smart phones, for example) wherein each electronic communication includes real-world data corresponding to parameters of an observation campaign. The observation campaign platform then analyzes the received real-world data against a metric corresponding to one or more parameters and determines whether or not any parameter should be changed. There are a great number of further examples of metrics analysis of collected real-world data against parameters of an observation campaign that are globally illustrated in the general flow diagram of the method of FIG. 4.

The method of FIG. 4 may begin at step 402 where an observation campaign is established at an observation campaign platform. The observation campaign may be established by an observation campaign coordinator (for example, a merchant wishing to know about retail products offered for sale at retail locations) who may select a number of campaign parameters defining an overall observation campaign. Such an observation campaign may initially be defined by the nature of the real-world data to be collected at step 470. That is, the coordinator may establish the real-world data to be collected as a digital image of a product for sale on a shelf. The campaign coordinator may then establish various parameters of the observation campaign at step 471. A great number of parameters may be established including at least the parameters discussed above with respect to FIG. 3. Further, the campaign coordinator may establish various metrics for the various parameters of the observation campaign at step 472. The various metrics provide tools for analysis of the collected real-world data such that parameters may be altered in response to the analysis. Further yet, the campaign coordinator may establish various measurement thresholds at step 473 such that an established threshold is to be met before an analysis is triggered against a metric that may possibly alter a parameter. That is, a specific number of observations (e.g., a threshold of observations) may be needed before any meaningful analysis can be (or even should be) conducted such that the observation campaign parameters are altered.

Once all real-world data settings, parameters, metrics and thresholds are established, the observation campaign may be launched at step 404. Launching the observation campaign may include storing all established settings, parameters, metrics and thresholds in a data store at or otherwise associated with the observation campaign platform. The observation campaign may be searchable by an observation application executing on remote mobile computers. In other embodiments, electronic communications are sent to remote mobile computers that meet a specific set of criteria (e.g., within a geographic location, observer reputation score threshold, and the like). As observers respond to opportunities presented through the now published observation campaign, real-world data may be received and collected at step 406.

As real-world data is collected, the real-world data may be initially analyzed at the observation campaign platform as to whether or not the received communication contains valid real-world data that can be used at query step 408. For example, an assessment may be made to determine if a received digital image is in focus or captures the correct real-world data. As another example, meta data about the real-world data, such as timestamp, and IP address origination and path may be used to validate the received real-world data. If the real-world data is assessed to be valid, it may be then assimilated into a collection of real-world data for one or more observation campaigns at step 410.

After assimilation (or after not assimilating in the case of invalid real-world data), an assessment of one or more established thresholds may be queried at step 414. As discussed briefly above, a threshold, in this context, may be defined at a specific number of observations since an observation campaign has been initiated or may be the passage of a specific amount of time since the beginning of a campaign. In other embodiments, the threshold may be a specific time interval, such as every 72 hours. In yet further embodiments, the threshold may be an accumulation of compensation value handed out to observers for successful observations. Still further, the threshold to be met may the combination of two or more thresholds (e.g., after the passage of at least 72 hours and the collection of 10 observations). Other thresholds scenarios are possible but not discussed further herein for brevity.

If a specific threshold is met at the query step 414, the method may move to an analysis stage at step 416. Of course, if a threshold is not met at the query step 414, the method may loop back to a data collection step 406 until one or more thresholds are met. At the data analysis step 416, the collected data may be compared against a specific metric with regard to a specific parameter. Such a metric comparison and various examples of a metric are discussed further below. For now, if the metric used is met (e.g., the collected data shows that a parameter should change after the metric analysis) then the method moves to step 420 where one or more specific observation campaign parameters are changed. Again, if the metric analysis is negative at step 416, then the method may loop back to a data collection step 406 until one or more thresholds are met again. Additionally, after the metric is analyzed, the specific threshold that was met to trigger the analysis may be reset (e.g., if the threshold was ten observations, then the new threshold would again be ten observations from this point in time).

Turning back to the metrics that are used to analyze the collected real-world data, a metric may simply be any manner of measuring the quantity, quality, rate, usability, and the like of the real-world data. For example, the metric may be a rate of successful observations given a specific time period or given a specific geographic location. A low success rate may lead to a parameter change requiring at least a certain level of reputation for an observer than can fulfill the opportunity. Similarly, if the success rate is rather high over a period of time, compensation per observation may be lowered as the campaign may be generating too much data to provide any meaningful insight beyond a first set of real-world world data (e.g., diminishing returns on value of duplicative data). In a similar manner, the metric may be a failure rate for observations.

In further examples, the metric may be rate of data collection for a given geographic area or during specific hours of the day. A metric analysis may also delve deeper into collected data to analyze specific real-world data against specific geographic regions (e.g., a perimeter of 3 miles surrounding a city center), specific demographics (e.g., the business district) and a specific clustering of collected data (e.g., locations near most observers, time stamps during waking hours, and the like).

In any metric analysis, once the metric is established, the metric may be used to determine whether a specific parameter is to be changed in an observation campaign. Further, various observation campaigns may also pool collected real-world data metric analysis to collectively change campaign parameters across multiple campaigns. This would allow unrelated observation campaigns to influence best practices for any observation campaign. Further, such globally assimilated campaign data may then lead to the establishment and updating of observation campaign templates having differently focused goals (e.g., fastest data collection, most reliable data collection, and the like). Such sharing of assimilated data analysis between campaigns is discussed next with respect to FIG. 5.

Figure 5:
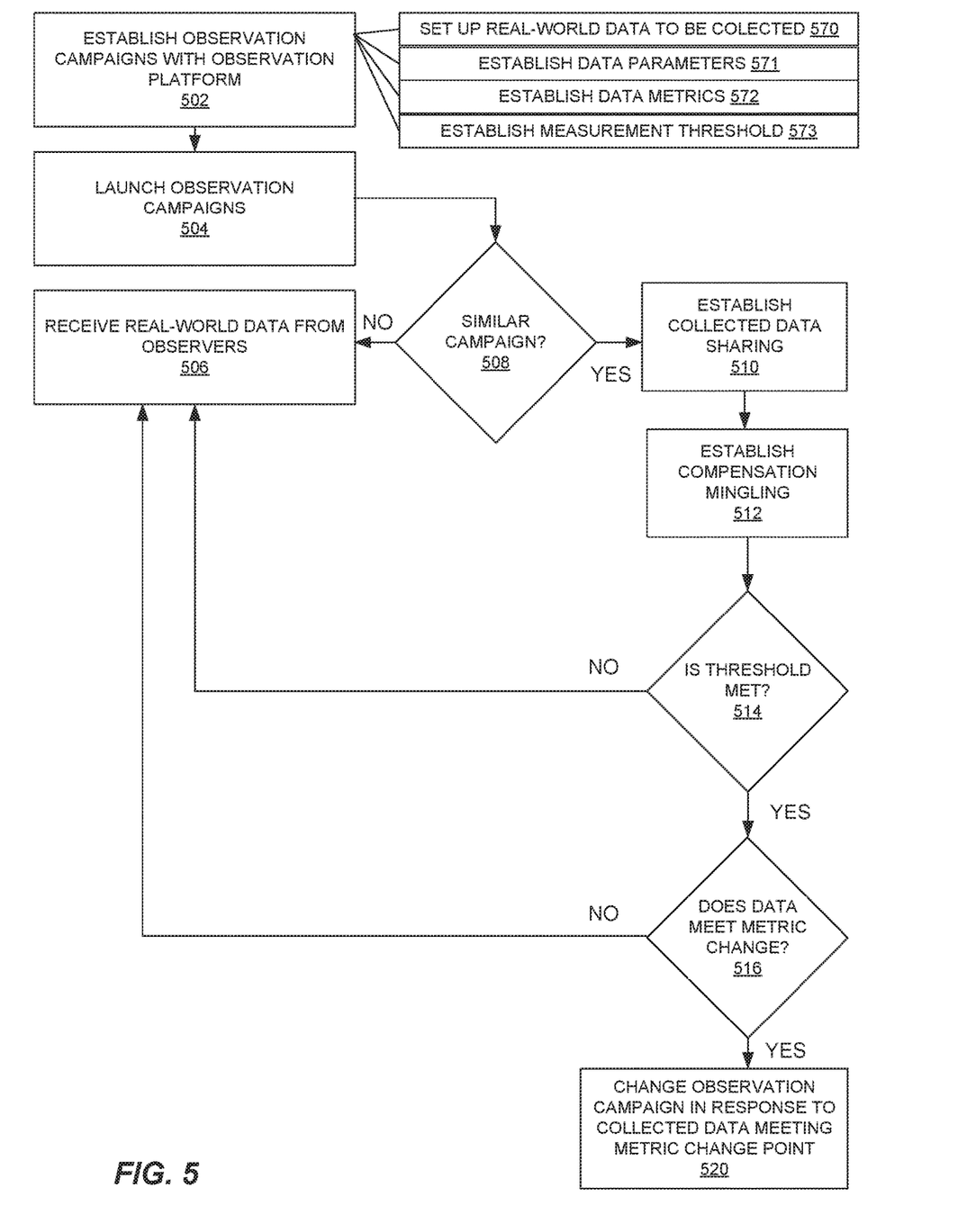
FIG. 5 is a method flow diagram illustrating a method for pooling resources between observation campaigns through analysis of collected data using the example system of FIG. 2 according to an embodiment of the subject matter disclosed herein.

FIG. 5 is a method flow diagram illustrating a method for pooling resources between observation campaigns through analysis of collected data using the example system of FIG. 2 according to an embodiment of the subject matter disclosed herein. The method of FIG. 5 may begin at step 502 where an observation campaign is established at an observation campaign platform. As discussed above, the observation campaign may be established by an observation campaign coordinator who may select a number of campaign parameters defining an overall observation campaign. Such an observation campaign may initially be defined by the nature of the real-world data to be collected at step 570. That is, the coordinator may establish the real-world data to be collected as a digital image of a product for sale on a shelf. The campaign coordinator may then establish various parameters of the observation campaign at step 571. A great number of parameters may be established including at least the parameters discussed above with respect to FIG. 3.

Further, the campaign coordinator may establish various metrics for the various parameters of the observation campaign at step 572. The various metrics provide tools for analysis of the collected real-world data such that parameters may be altered in response to the analysis. Further yet, the campaign coordinator may establish various measurement thresholds at step 573 such that an established threshold is to be met before an analysis is triggered against a metric that may possibly alter a parameter. That is, a specific number of observations (e.g., a threshold of observations) may be needed before any meaningful analysis can be (or even should be) conducted such that the observation campaign parameters are altered. The campaign establishment steps may be repeated in simultaneous fashion for several concurrent observation campaigns.

Once each set of real-world data settings, parameters, metrics and thresholds are established for each respective observation campaigns (or at least two or more observation campaigns), the observation campaigns may be launched at step 504. As before, launching the observation campaign may include storing all established settings, parameters, metrics and thresholds in a data store at or otherwise associated with the observation campaign platform. Each observation campaign may be searchable by observation application executing on remote mobile computers. In other embodiments, electronic communications are sent to remote mobile computers that meet a specific set of criteria (e.g., within a geographic location, reputation score threshold, and the like). As observers respond to opportunities presented through the now published observation campaign, real-world data may be received and collected at step 506.

In this method, after each observation campaign is launched at step 504, a query step 508 may determine if there are similar observation campaigns that may benefit from sharing analytics data that may be collected and assimilated. If this observation is to be a standalone observation campaign (e.g., no data sharing) then data may simply be collected at step 506 without regard to analytics or data sharing. However, if a newly launched observation campaign is to be included in a data sharing methodology, then specific parameters that define the nature of the data sharing may be set at step 510. Further, the similar observation campaigns may also commingle available compensation to incentive observation by observers at step 512.

After assimilation (or after not assimilating in the case of invalid real-world data), an assessment of one or more established thresholds may be queried at step 514 similar to the method discussed with respect to FIG. 4. If a specific threshold is met at the query step 514, the method may move to an analysis stage at step 516. Of course, if a threshold is not met at the query step 514, the method may loop back to a data collection step 506 until one or more thresholds are met. At the data analysis step 516, the collected data may be compared against a specific metric with regard to a specific parameter. Such a metric comparison and various examples of a metric were discussed previously with respect to FIG. 4. If the metric used is met (e.g., the collected data shows that a parameter should change after the metric analysis) then the method moves to step 520 where one or more specific observation campaign parameters are changed for each observation campaign in the grouping of campaigns. Again, if the metric analysis is negative at step 516, then the method may loop back to a data collection step 506 until one or more thresholds are met again. Additionally, after the metric is analyzed, the specific threshold that was met to trigger the analysis may be reset (e.g., if the threshold was ten observations, then the new threshold would again be ten observations from this point in time).

Figure 6:
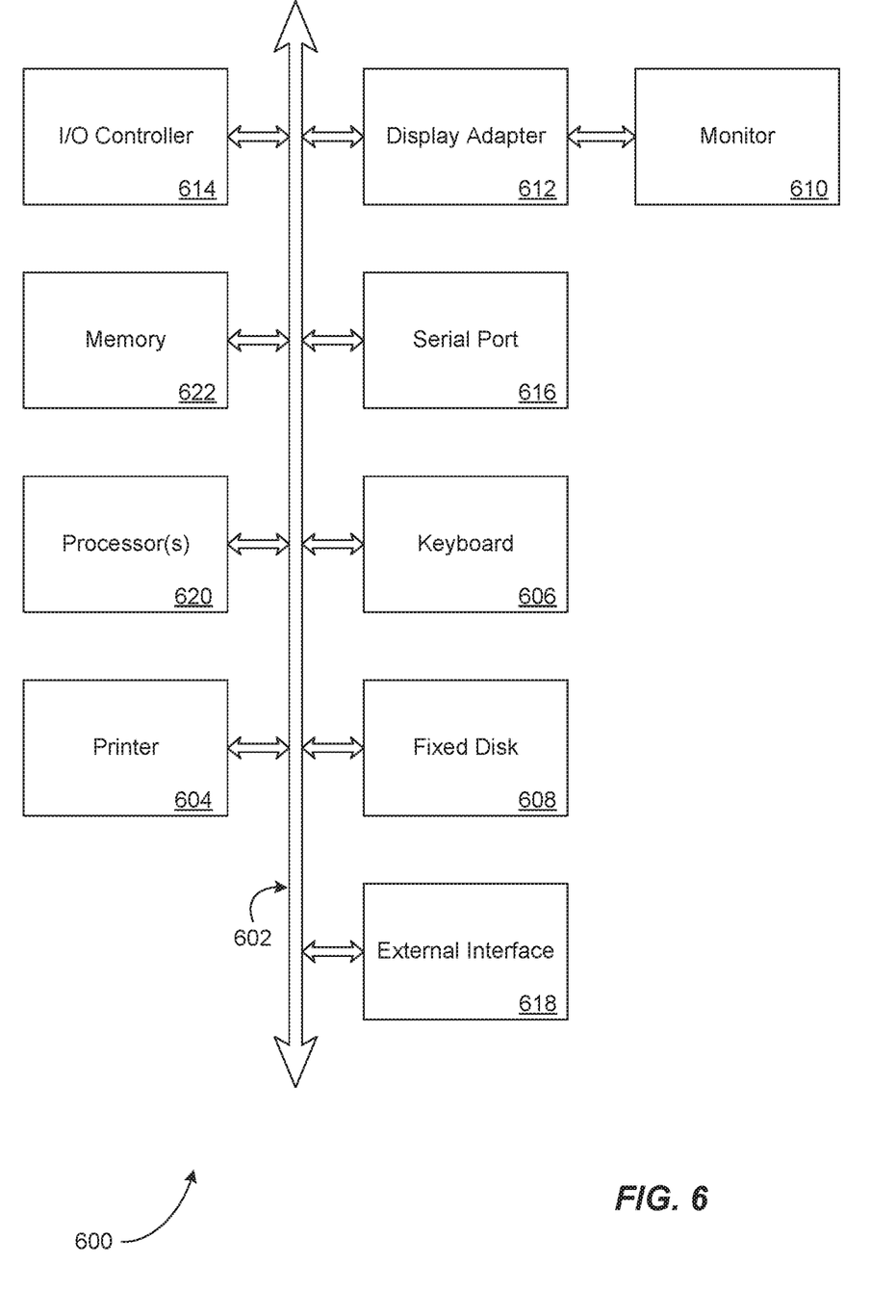
FIG. 6 is a diagram illustrating elements or components that may be present in a computer device or system configured to implement a method, process, function, or operation in accordance with an embodiment.

FIG. 6 is a diagram illustrating elements or components that may be present in a computer device or system configured to implement a method, process, function, or operation in accordance with an embodiment. In accordance with one or more embodiments, the system, apparatus, methods, processes, functions, and/or operations for enabling efficient configuration and presentation of a user interface to a user based on the user's previous behavior may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 6 is a diagram illustrating elements or components that may be present in a computer device or system 600 configured to implement a method, process, function, or operation in accordance with an embodiment. The subsystems shown in FIG. 6 are interconnected via a system bus 602. Additional subsystems include a printer 604, a keyboard 606, a fixed disk 608, and a monitor 610, which is coupled to a display adapter 612. Peripherals and input/output (I/O) devices, which couple to an I/O controller 614, can be connected to the computer system by any number of means known in the art, such as a serial port 616. For example, the serial port 616 or an external interface 618 can be utilized to connect the computer device 600 to further devices and/or systems not shown in FIG. 6 including a wide area network such as the Internet, a mouse input device, and/or a scanner. The interconnection via the system bus 602 allows one or more processors 620 to communicate with each subsystem and to control the execution of instructions that may be stored in a system memory 622 and/or the fixed disk 608, as well as the exchange of information between subsystems. The system memory 622 and/or the fixed disk 608 may embody a tangible computer-readable medium.

It should be understood that the present disclosure as described above can be implemented in the form of control logic using computer software in a modular or integrated manner. Based on the disclosure and teachings provided herein, a person of ordinary skill in the art will know and appreciate other ways and/or methods to implement the present disclosure using hardware and a combination of hardware and software.

Any of the software components, processes or functions described in this application may be implemented as software code to be executed by a processor using any suitable computer language such as, for example, Java, JavaScript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments and does not pose a limitation to the scope of the disclosure unless otherwise claimed. No language in the specification should be construed as indicating any non-claimed element as essential to each embodiment of the present disclosure.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the present subject matter is not limited to the embodiments described above or depicted in the drawings, and various embodiments and modifications can be made without departing from the scope of the claims below.

That which is claimed is:

1. A computer-based method, comprising:
sending at least one communication as a first push notification to one or more remote computing devices configured to execute a real-word data observation application having a pre-established relationship with a real-world observance opportunity platform, wherein sending the electronic communication corresponding to an opportunity of an observation campaign is based upon a detected proximity of the mobile computing device to a location associated with the opportunity;
receiving an electronic communication from the one or more remote computing devices configured to execute a real-word data observation application having a pre-established relationship with a real-world observance opportunity platform, each electronic communication including real-world data that includes audio visual data and location meta data corresponding to at least one observable parameter about a salable product that is part of the observation campaign to collect real-world data, the parameters of the real-world campaign stored in a memory at a server computing device executing the real-world observance opportunity platform and accessible by a real-world data observation application executing on the one or more remote computing devices;
verifying that the received audio visual data and location meta data from each computing device meet the parameters of the observation campaign;
subsequent to the verifying, analyzing the received audio visual data and location meta data from a plurality of the remote computing devices against further metrics to identify a data metric issue describing the overall success or failure of the campaign;

analyzing the received audio visual data and location meta data against a metric corresponding to one or more parameters of the observation campaign;

changing one or more parameters of the observation campaign stored in the memory in response to the analyzing such that displayable information about the observation campaign stored in the memory is updated with the changed parameters when the analyzed received real-world data identifies the data metric issue; and sending a plurality of second push notifications to a plurality of remote computing devices including the one or more remote computing devices with the changed one or more parameters about the product that is part of the observation campaign in response to the changing of one or more parameters.

2. The computer-based method of claim 1, further comprising updating the observation applications executing on the one or more remote computing devices in response to changing one or more parameters.

3. The computer-based method of claim 1, further comprising establishing the parameters of the observation campaign at a server computer executing an observation campaign platform such that a campaign coordinator sets initial parameters of the observation campaign.

4. The computer-based method of claim 1, further comprising establishing the metrics of the parameters of the observation campaign at a server computer executing an observation campaign platform such that a campaign coordinator sets initial metrics of the parameters of the observation campaign.

5. The computer-based method of claim 1, further comprising receiving real-world data until a threshold is met prior to analyzing the collected real-world data against the metric.

6. The computer-based method of claim 5, wherein the threshold further comprises a threshold amount of collected real-world data.

7. The computer-based method of claim 5, wherein the threshold further comprises a threshold amount of time for collecting real-world data.

8. The computer-based method of claim 5, further comprising resetting the threshold if the analysis of the collected real-world data results in changing one or more parameters in the observation campaign.

9. An observation campaign platform executing on one or more networked computers having one or more processors for executing computer instructions, the observation campaign platform comprising:

an observation coordination module configured to execute instructions for establishing an observation campaign having one or more parameters for collecting real-world data that includes audio visual data and location meta data about a salable product and configured to establish communicative relationship with one or more real-word data observation application executing on one or more remote computing devices;

a data store coupled to the observation campaign module and configured to store the one or more parameters of the observation campaign;

a communication module coupled to the observation campaign module and configured to send electronic communications to the remote computing devices based on a detected proximity of the remote computing devices to a corresponding observation opportunity and to receive electronic communications from the one or more remote computing devices, the electronic communication including collected audio visual data and location meta data corresponding to the salable product that is part of the observation campaign;

an analysis module coupled to the observation campaign module and configured to verify that the collected audio visual data and location meta data meet the parameters of the observation campaign and further to analyze the received audio visual data and location meta data against further metrics to identify a data metric issue describing the overall success or failure of the campaign; and an update module coupled to the observation campaign module and configured to change one or more parameters of the observation campaign stored in the data store in response to the analyzing when the analyzed received real-world data identifies the data metrics issue and configured to send a plurality of push notifications to a plurality of remote computing devices including the one or more remote computing devices with the changed one or more parameters about the product that is part of the observation campaign in response to the changing of one or more parameters.

10. The observation campaign platform of claim 9, wherein the collected real-world data comprises a digital image.

11. The observation campaign platform of claim 9, wherein the one or more parameters further comprise one of the group including: total cost outlay, total cost per observation, total number of observations, minimum observations, maximum observations, time limit for observations, time frame for observations, geographic limitation on observations, demographic limitation on observation, observer reputation score limitations, data quality parameters, image quality parameters, lockout parameters, exclusivity parameters, and failure parameters.

12. The observation campaign platform of claim 9, wherein the metric comprises a success rate for observations.

13. The observation campaign platform of claim 9, wherein the metric comprises a failure rate for observations.

14. The observation campaign platform of claim 9, wherein the metric comprises a data collection rate.

15. The observation campaign platform of claim 9, wherein the metric comprises a geographic region perimeter.

16. The observation campaign platform of claim 9, wherein the metric comprises a clustering of time of observations.

17. The observation campaign platform of claim 9, wherein the metric comprises a clustering of geographic locations of observations.

18. A cloud-based multi-user observation computing system, comprising:

a plurality of mobile computing devices each executing an observation application having a pre-established relationship with an observation campaign platform and configured to communicate with one or more networked computers hosting observation opportunities;

a cloud-based observation platform executing the observation campaign platform on the one or more networked computers, the observation campaign platform including:

an observation coordination module configured to execute instructions for establishing an observation campaign having one or more parameters for collecting real-world data that includes audio visual data and location meta data;

a data store coupled to the observation campaign module and configured to store the one or more parameters of the observation campaign;

a communication module coupled to the observation campaign module and configured to send electronic communications to the remote computing devices based on a detected proximity of the remote computing devices to a corresponding observation opportunity and to receive electronic communications from remote computing devices, the electronic communication including the collected audio visual data and location meta data corresponding to a product for sale that is part of the observation campaign;

an analysis module coupled to the observation campaign module and configured to verify that the collected audio visual data and location meta data meet the parameters of the observation campaign and further to analyze the received audio visual data and location meta data against further metrics to identify a data metric issue describing the overall success or failure of the campaign; and an update module coupled to the observation campaign module and configured to change one or more parameters of the observation campaign stored in the data store in response to the analyzing when the analyzed received real-world data identifies the data metrics issue and configured to send a plurality of push notifications to a plurality of remote computing devices including the one or more remote computing devices with the changed one or more parameters about the product that is part of the observation campaign in response to the changing of one or more parameters.

19. A cloud-based multi-user observation computing system of claim 18, wherein the observation campaign platform further comprises an update module coupled to the observation campaign module and configured to send electronic communications to the plurality of mobile computing device with updates to the parameters of the observation campaign in response to changing one or parameters of the observation campaign.

20. A cloud-based multi-user observation computing system of claim 18, wherein the observation campaign platform further comprises a template module configured to assimilate collected real-world data to generates one or more observation campaign templates having one or more parameters based on one or more metrics.

* * * * *

UNITED STATES PATENT AND TRADEMARK OFFICE
CERTIFICATE OF CORRECTION

PATENT NO. : 10,990,986 B2
APPLICATION NO. : 15/239607
DATED : April 27, 2021
INVENTOR(S) : Hugh Howard Holman and Erik Eugene Chelstad Page 1 of 1

It is certified that error appears in the above-identified patent and that said Letters Patent is hereby corrected as shown below:

In the Claims

Claim 1, Line 4: Please replace "real-word" with "real-world"

Claim 9, Line 11: Please replace "real-word" with "real-world"

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*